United States Patent Office

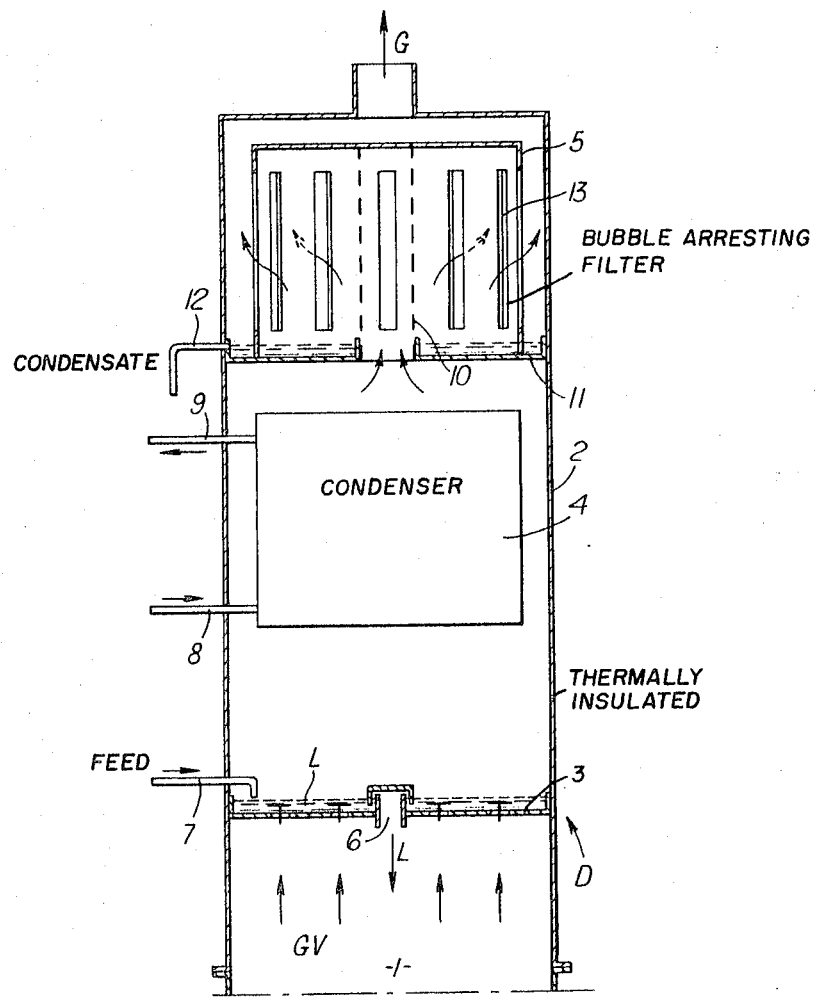

3,456,428
Patented July 22, 1969

---

3,456,428
REMOVAL OF BUBBLES FROM ADIPIC ACID-NITROGEN VAPOR
Georges Bichet, Roussillon, Paul Cruiziat, Lyon, Jean Damay, Roussillon, and Pierre Joseph Frechet, Caluire, France, assignors to Rhone-Poulenc S.A., Paris, France, a French body corporate
Filed Mar. 6, 1967, Ser. No. 620,882
Claims priority, application France, Mar. 7, 1966, 52,351
Int. Cl. B01d 47/02
U.S. Cl. 55—68      1 Claim

ABSTRACT OF THE DISCLOSURE

Bubbles of liquid adipic acid suspended in a gaseous mixture of nitrogen and vapor of adipic acid are removed by passage through molten adipic acid. The resultant gaseous mixture is then passed through a condensing zone, the residue gases then being passed through a bubble arresting filter.

---

The present invention concerns a process for removing bubbles from saturated vapour containing a suspension of bubbles.

During evaporation by heating, the vapours formed may carry along fine liquid bubbles of the product evaporated in the form of a fine mist, and this is the well-known phenomenon of "priming." In the same way, when a gas at a high temperature and moving at a high speed is made to pass through a material which is to be evaporated, it is found that the mixture of gas and vapour carries along liquid bubbles, the number of these being all the greater in proportion to the saturation of the vapour.

In many cases, particularly when the evaporated material decomposes under heat, it is necessary to free the carrier gas (vapours or mixture of vapours and any gas) of the bubbles which it entrains. This is true for example when the carrier gas is conducted through tubes to a reaction zone wherein it passes over a catalytic bed. It is then found that the liquid bubbles or thermolabile solids, which may or may not be charged with more or less heavy impurities, cause the formation of deposits in the tubing, with corresponding blockages, and on the catalytic beds, thus resulting in a lowered activity of the catalyst, which becomes coated with tars, and in some cases making it impossible to keep it in suspension in a fluidised bed.

Many processes or apparatus have already been proposed for removing bubbles from a gas carrying with it such liquid or solid particles (cf. J. H. Perry, Chemical Engineers' Handbook, Fourth edition, pages 18–83). Thus it has been proposed to use chambers of a cross-section calculated to give the gas a sufficient speed to cause the decantation of the solid or liquid bubbles.

It has also been proposed to use columns having multiple baffles formed in stacks, which cause the depositing on the walls of bubbles which, in joining one another, form a thin trickling flow of liquid. In these columns, it is also possible to use trays provided with valves, metal cloths, expanded metal or knitted cushions.

It is also known to use chambers of sufficiently large volume which are provided with baffles, causing the gases to go through changes in direction. By inertia, the bubbles impinge against the walls, coalesce and then trickle down to the bottom of the apparatus.

It has also been proposed to use separators of the cyclone type which impart a turbulent movement to the gases causing the agglomeration of bubbles in the form of droplets which then separate from the gases.

These various processes are generally satisfactory with stable liquid compounds which do not decompose under the action of heat, or under the catalytic effect of the material constituting the baffles or other material filling the columns. However, the same is not true if the liquids are liable to decompose and produce, under the effect of the temperature occurring or under the catalytic effect of the materials used, decomposition products which tend to form tars which, by coking, cause blocking. This effect is further accentuated by the presence in the bubbles of impurities which already result from a decomposition of the products being carried.

To limit these blockages, it is possible to use devices such as self-washing of the filling material by the liquid formed of the agglomerate of liquid bubbles. However, there is always a point at which the washing liquid is insufficient to entrain the heavy products formed which are either viscous liquids or solid particles, and blockage occurs. On the other hnad, when the bubbles already comprise decomposition products, the self-washing liquid gradually becomes so enriched with these products that it can no longer entrain the impurities formed at the condensation of the bubbles and the self-washing liquid then becomes completely ineffective.

According to one aspect of the present invention, there is provided a process for removing bubbles from a saturated vapour, containing a suspension of liquid bubbles and possibly a gas and/or solid particles such process comprising the steps of condensing a very small quantity of the vapour and thereafter passing the vapour and condensed vapour through a bubble arresting device to form a film of very pure liquid on the arresting device for washing the latter.

In order to carry out the process according to the invention, it is possible to use one or more bubble-arresting devices which may or may not be of increasing effectiveness. Particularly suitable devices are those mentioned by J. H. Perry as referred to above at pages 18–84 and 18–85.

In certain cases it is possible to carry out the condensation of the vapour from which bubbles are to be removed successively at the level of a plurality of bubble-arresting devices.

The condensation of the vapour at the level of the bubble-eliminating stages can be carried out for example by a suitable lowering of temperature at the level of the bubble-removing device in accordance with the quantity of condensate desired (this may be determined experimentally) and the vapour tension of the evaporated product.

The quantity of liquid to be condensed is dependent on how thermolabile the evaporated product is, the ratio of impurities in the bubbles, the quantity of bubbles in the vapours, all factors which depend on the speed of the evaporation gas or vapours, the viscosity of the gas or liquid, and the surface tension of the liquid. It may also be advantageous to remove this condensed liquid and return it to some particular point in the apparatus.

The process according to the invention can be used for eliminating bubbles from any product, thermolabile or not, and more particularly for eliminating bubbles from gases, vapours or mixtures of saturated vapours and gases intended to come into reaction on a catalytic bed.

In order that the invention may more readily be understood, the following description is given, merely by way of example, reference being made to the accompanying drawing, in which the sole figure is a schematic sectional side elevation of one embodiment of apparatus for carrying out the present invention.

The bubble removing apparatus D of the present invention, includes a lower portion 1 for connection to a wall 2 which can be suitably equipped with means (not shown) for ensuring that the desired temperature is maintained within the apparatus.

A washing tray 3 is positioned at the lower portion of the wall, and receives at 7 all or part of the liquid for evaporation. This liquid is kept at a suitable level, normally between 5 and 50 mm., by an overflow device 6 through which the liquid L then passes directly, or by appropriate means not shown in the drawings, to the evaporation zone in the previous portion of the apparatus. The saturated gases GV, charged with bubbles, bubble through the liquid L and give up therein any solid particles which may have been entrained, and also the largest bubbles.

A condenser 4 supplied at 8 with a cooling liquid which is discharged at 9 is positioned within the walls 2 above plate 3. The shape and dimensions of the condenser and its supply with cooling fluid are selected in accordance with the nature of the gas from which bubbles are to be removed, so as to cause a lowering of temperature such that the saturated gas comes very slightly below its dew point. A temperature reduction bringing the gas to a temperature 0.1 to 1° C. below its dew point is generally sufficient.

The gas is then immediately made to pass through a bubble arresting device 5 of a conventional type, preferably an impact plate filter. The dimensions and arrangement of the bubble arresting device are such that the gases give-up the bubbles, which act as condensation nuclei, and a condensation of vapours is brought about. A film of condensed liquid is formed which wets the active parts of the device, carrying along the deposited bubbles and preventing their decomposition if necessary. The liquid is collected on a tray 11 connected to the wall 2, and removed by means of an overflow device 12. The saturated gas issues through the orifices 13 of the device 5 and escapes at G.

Automatic operation of the assembly takes place without any need for supervision other than that of maintaining an appropriate cooling by means of the condenser 4.

The following example, which is not intended to limit the invention, shows how the invention can be carried into effect in the case of a gas saturated with vapour of a thermolabile product. Of course, the process according to the invention may be applied in the same way to the treatment of saturated gases or vapours charged with bubbles of non-labile products.

The process of the invention was applied to the removal of bubbles from vapours of adipic acid, carried along by an inert gas and intended to pass over a catalytic bed at the same time as a hot ammonia current, so as to produce adiponitrile. It is known that adipic acid is thermolabile and that its decomposition is catalysed by metals such as iron. Products are then formed such as $CO_2$, $H_2O$, cyclopentanone and heavier polymerisation or coking products. The liquid bubbles of adipic acid are sensitive to decomposition and already contain decomposition products, and it is necessary to eliminate them.

Adipic acid was evaporated by passing a hot nitrogen current (260° C.) into molten adipic acid, in an appropriate apparatus, under an absolute pressure of 800 mm. of mercury. The gaseous mixture issuing from the evaporation apparatus, which is constituted by nitrogen and adipic acid vapours, contains fine bubbles of liquid adipic acid in suspension. These bubbles contain degradation products which, by coking, are deposited on the walls of the tubes, which causes a reduction in heat exchange, which necessitates stoppages.

Using apparatus as shown in FIGURE 1, in which the thermally insulated casing 2 was cylindrical and had a diameter of 3.50 m. and a height of 1.47 m., molten adipic acid was fed in at 260° to the tray 3, provided with valves of conventional type. The operation of the tray was regulated to maintain therein a depth of 10 to 20 mm. of molten adipic acid, liquid acid flowing through the overflow device 6 from which it was conducted into the evaporation stage, and saturated gas GV, containing bubbles and coming from the evaporator was at a temperature of 260° and under an absolute pressure of 800 mm. of mercury.

Air supplied at 8 at 20° C. to a cylindrical condenser coaxial with wall 2, was discharged at 9, and flow was regulated to lower the temperature of the gaseous mixture by 0.5° C.

The device for arresting bubbles 5 was an impact filter of the type described in the Transactions of the Institute of Chemical Engineers 22, page 110 (1944) and represented diagrammatically in the figure, the gases being admitted through a central orifice 10 and successively encountering two plates and issuing through the slots 13, and passing out at G. By operating in this way, a condensation rate of ½ kg./hour of adipic acid was sufficient to ensure the elimination of bubbles from a gaseous mixture coming from the 500 kg./hour evaporation of adipic acid during a period of four months, without there being any increase in the pressure drop in the apparatus in general.

With the condener 4 removed, it was found that deposits were formed in the impact filter which, after 24 hours operation, cause blockages which require stopping the installation and changing the filter.

We claim:

1. A process for removing bubbles from a gaseous mixture of nitrogen and adipic acid vapor containing fine bubbles of liquid adipic acid in suspension, said process comprising the steps of:
   (a) passing the gaseous mixture upwardly through a column having a lower washing zone containing a layer of molten adipic acid;
   (b) passing the gaseous-liquid mixture through said layer of molten adipic acid;
   (c) passing the resultant vapor upwardly through an upper condensing zone, maintained at a temperature of 0.1 to 1° C. below the dew point of the vapor to produce a condensate portion;
   (d) thereafter passing the vapor containing said bubbles and condensate portion through a bubble arresting filter, whereby the condensate portion wets and washes said filter and the liquid portion of said bubbles is separated from the saturated vapor; and
   (e) removing said saturated vapor overhead from said column.

References Cited

UNITED STATES PATENTS

| | | | |
|---|---|---|---|
| 1,258,562 | 3/1918 | Harris | 203—20 X |
| 1,714,963 | 5/1929 | Trumble | 202—198 X |
| 2,217,516 | 10/1940 | Houpt | 260—537 |
| 2,224,984 | 12/1940 | Potts et al. | 202—197 X |
| 2,242,466 | 5/1941 | Greenewalt et al. | 260—537 |
| 3,020,214 | 2/1962 | Beduhn et al. | 203—20 X |
| 3,096,369 | 7/1963 | Soeterbroek et al. | 260—537 |
| 3,138,440 | 6/1964 | Weittenhiller et al. | 203—40 |
| 3,160,571 | 12/1964 | Mulford et al. | 202—197 X |
| 1,962,153 | 6/1934 | Peterkin | 202—200 X |
| 3,334,027 | 8/1967 | Goeldner | 203—40 |

NORMAN YUDKOFF, Primary Examiner

F. E. DRUMMOND, Assistant Examiner

U.S. Cl. X.R.

55—95; 202—197; 203—20; 260—537